April 9, 1929.  A. MOORE  1,708,428
TURBULENCE PRODUCING COMBUSTION CHAMBER
FOR INTERNAL COMBUSTION ENGINES
Filed Oct. 22, 1926
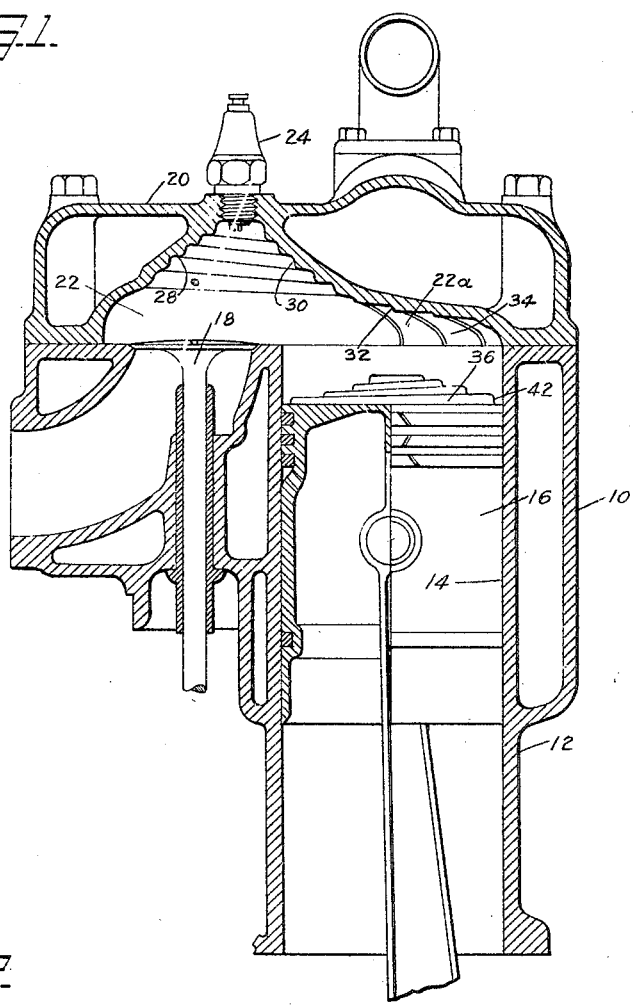
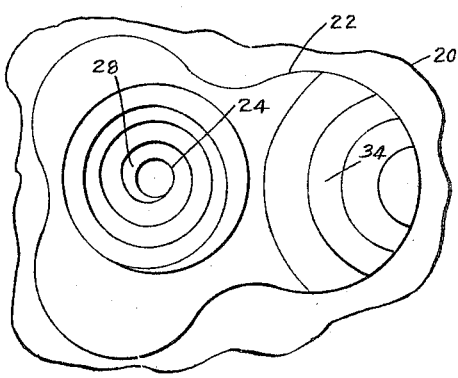
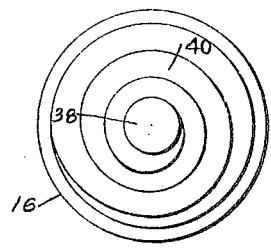
INVENTOR
Arlington Moore
BY H. H. Dyk
ATTORNEY Patented Apr. 9, 1929.

1,708,428

UNITED STATES PATENT OFFICE.

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE.

TURBULENCE-PRODUCING COMBUSTION CHAMBER FOR INTERNAL-COMBUSTION ENGINES.

Application filed October 22, 1926. Serial No. 143,317.

My invention is of an internal combustion engine having a combustion chamber of a formation adapted to promote turbulence and avoid detonation.

One object of the invention is the provision of means for creating especially high turbulence or agitation of the charge gases in the neighborhood of the point of ignition.

Other objects will be pointed out in connection with the description of an illustrative embodiment of the invention shown in the accompanying drawings in which Fig. 1 is a cross-section of an L-head four-cycle internal combustion engine with combustion chamber constructed to embody my invention. Fig. 2 is a bottom plan view of the combustion chamber formed in the cylinder head of Fig. 1. Fig. 3 is a plan view of the piston head.

Reference character 10 designates a four-cycle internal combustion engine, which is here shown as of the side valve type, and specifically as an L-head engine, having a cylinder block 12 with the cylinder bore 14, piston 16, side valves 18, of which one is shown, cylinder head 20, combustion chamber 22 and spark plug, or equivalent ignition means, 24.

The language of the vertical engine is used herein, though not in a limiting sense, as the cylinders may be horizontal, inclined or arranged in other ways.

The spark plug 24 is located at substantially the apex of a substantially conically recessed extension of the combustion chamber 22.

The walls of the recess are formed to present alternating surfaces arranged at an angle to one another and preferably to present a series of substantially plane surfaces 28 alternating with substantially vertical surfaces 30, the junctions between these surfaces being rounded or filleted to prevent undue localized heating. The substantially plane surfaces 28 are preferably slanted somewhat to impart a swirling effect to gases coming into contact therewith, and a desirable arrangement is obtained by a spiral arrangement of these surfaces as shown in Figs. 1 and 2.

The portion 22ª of combustion chamber 22, which is over the cylinder bore 14, is also provided with a ceiling surface adapted to produce turbulence in the gases by coming into contact therewith. In the form shown, the alternation of generally horizontal and generally vertical surfaces is secured by forming this part of the combustion chamber ceiling, which is in general of substantially half dome formation and gradually decreases in height from the valve side of the cylinder bore to the side thereof remote from the valves, with the alternating riser surfaces 32 and the substantially arch ceiling surfaces 34, which latter surfaces, in addition to being arched to conform generally to the substantially dome-like formation of this part of the combustion chamber, are preferably formed in substantially circular arcs when viewed in plan as in Fig. 2.

While the piston head may be of various formations, it is preferably provided with the head projection 36 to extend or project up into the combustion chamber when the piston is at top center. Such upward projection 36 of the piston 16 is preferably substantially helicoidal in form comprising a center platen 38, the spirally volute ramp surfaces 40 and the similarly volute riser surfaces 42 extending between adjacent convolutions of the spiral ramp surfaces. This piston head is, however, not claimed per se herein.

Without commitment to a specific theory, my understanding of the operation of an internal combustion engine, such as described and embodying my invention, is that at intake the charge gases are set into turbulence by the differently directed surfaces encountered, which turbulence has components of swirling movement due to the spiral surfaces encountered, including the spiral ramp and riser surfaces in the spark plug recess and on the piston head, and the fuel is thoroughly distributed among the other charge components, that this result of turbulence and admixing is carried to a still higher degree upon the compression stroke of the piston, that flame travel after ignition is speeded up by the high state of turbulence obtained and by the surface combustion effect of gas concentration adjacent to the extensive surface area obtained, that any pressure wave during burning of the charge is broken up or split up by the alternation of successively differently directed surfaces encountered, that excessive heat which would be productive of detonation is avoided by heat withdrawal from the extensive surfaces provided on piston head and combustion chamber walls, and that the turbulent gases carry away heat from any part which could become incandescent and cause preignition and deliver it to the extensive heat conducting surfaces on cylinder heat and piston.

The highest benefits of the present invention are realized when complete combustion and absence of carbon deposits are obtained by the use of my improved system of combustion, involving the supplying to the engine intake above the throttle of exhaust gas and air at temperatures and in proportions and quantities metered to suit the engine requirements at varying speeds and loads, as set forth, for exaxmple, in my copending application Serial No. 757,075, filed Dec. 19, 1924.

The subject matter of my invention disclosed in this application and not claimed therein is disclosed and claimed in part in my copending application Serial No. 140,726, filed October 11, 1926, renewed December 4, 1928, in part of my copending application Serial No. 141,289, filed October 13, 1926, in part in my copending application Serial No. 142,230, filed October 18, 1926, renewed December 4, 1928, and in part in my copending application Serial No. 142,231 filed October 18, 1926.

This application is also a continuation-in-part of my application Serial No. 125,414, filed July 28, 1926, and of my application Serial No. 142,231, filed October 18, 1926.

I claim:

1. An internal combustion engine comprising a portion of the ceiling of the combustion chamber diverging downwardly and surrounding a portion of the combustion chamber space to provide a recess closed at the sides thereof and open at the base thereof; the wall of said recess consisting of a series of surfaces arranged in step formation.

2. An internal combustion engine comprising a portion of the ceiling of the combustion chamber diverging downwardly and surrounding a portion of the combustion chamber space to provide a recess closed at the sides thereof and open at the base thereof; the wall of said recess consisting of a series of surfaces arranged in step formation, and ignition means at the upper end of said recess.

3. An internal combustion engine comprising a portion of the ceiling of the combustion chamber diverging downwardly and providing a conical recess open at the base thereof, and ignition means at the smaller end of said recess; the wall of said recess consisting of horizontally extending surfaces facing downwardly and vertically extending surfaces connecting the same.

4. An internal combustion engine comprising a portion of the ceiling of the combustion chamber diverging downwardly and surrounding a portion of the combustion chamber space to provide a recess open at the base thereof; the wall of said recess and a portion of the wall of said combustion chamber beyond said recess consisting of a series of surfaces arranged in step formation.

5. An internal combustion engine comprising a downwardly diverging portion of the ceiling of the combustion chamber having a recess provided with surfaces of step formation, a spark plug therein, and a piston having a projection into the combustion chamber provided with surfaces of step formation.

6. An internal combustion engine comprising a downwardly diverging portion of the ceiling of the combustion chamber having a recess provided with surfaces of step formation, a spark plug therein, and portions of step formation within the combustion chamber beyond said recess.

7. An internal combustion engine comprising a portion of the ceiling of the combustion chamber having a recess about the spark plug provided with surfaces of step formation; a portion of the wall of said combustion chamber beyond said recess likewise consisting of surfaces arranged in step formation, and a piston having a head projection of step formation adapted to extend into the combustion chamber.

8. In an internal combustion engine, a combustion chamber having a recess in which the ignition device is located and having the combustion chamber ceiling about such recess provided with spiral ramp surfaces.

9. In an internal combustion engine, a combustion chamber having a substantially conical recess provided with substantially spiral ramp and riser surfaces, and a hole for a spark plug provided in substantially the center of said recess.

10. In an L-head four-cycle internal combustion engine, a combustion chamber having the portion of its ceiling over the valves provided with an upwardly extending spirally ramped surface, and the portion over the cylinder bore of substantially half-dome formation and provided with alternating sets of differently directed surfaces.

11. In an internal combustion engine, a combustion chamber having a recess about the spark plug provided with spiral lead surfaces, and a piston having a projection into the combustion chamber provided with spiral lead surfaces.

12. In an L-head, four-cycle internal combustion engine, a cylinder head having the ceiling of the combustion chamber therein at the valve end formed with an upward substantially conical extension around the spark plug hole having a surface comprising spiral ramp and riser portions, and having the end thereof over the cylinder bore of substantially half-dome formation with alternating substantially arched surfaces and riser surfaces, and a piston having a substantially helicoidal head projection extending into the combustion chamber and provided with a spiral ramp and riser surfaces about such projections.

13. In an L-head, four-cycle internal combustion engine, a cylinder head having the combustion chamber therein formed with its ceiling walls divided into portions angularly related to one another and at least in part of spirally ramped formation and a piston having a head projection adapted to extend into the combustion chamber and having its top surface of spiral ramp formation.

14. In an internal combustion engine, a cylinder head having the combustion chamber therein formed with a spirally ramped ceiling wall, and a piston having a spirally ramped projection on its head adapted to project into the combustion chamber at the top of the piston stroke.

15. An internal combustion engine comprising a cylinder having a combustion chamber at the end thereof extending laterally therefrom, a piston in said cylinder having a head of step formation projecting into said combustion chamber in the top center position of said piston, intake and exhaust valves in the laterally extending portion of said combustion chamber, and ignition means therein; the ceiling of the part of the combustion chamber over said piston being of terrace formation and varying in height from the laterally extending portion of said combustion chamber.

16. An internal combustion engine comprising a cylinder having a combustion chamber at the end thereof extending laterally therefrom, a piston in said cylinder, and valves in said laterally extending portion of said combustion chamber; said piston having a step formation projecting into said combustion chamber in the top center position thereof in exposed relation to the laterally extending portion thereof, and the ceiling of said combustion chamber opposite said piston having a step formation decreasing in height substantially from the valve side of the piston to the opposite side thereof.

17. An internal combustion engine comprising a cylinder having a combustion chamber at the end thereof extending laterally therefrom, a piston in said cylinder, and valves in said laterally extending portion of said combustion chamber; said piston having a helicoidal step formation projecting into said combustion chamber in the top center position thereof in exposed relation to the laterally extending portion thereof, and the ceiling of said combustion chamber opposite said piston having a step formation decreasing in height substantially from the valve side of the piston to the opposite side thereof.

18. An internal combustion engine comprising a cylinder having a combustion chamber at one end thereof extending laterally therefrom; the ceiling of said combustion chamber extending downwardly from the laterally extending portion thereof to the side of the cylinder remote from said portion, and a piston in said cylinder having a head of step formation increasing in height towards the center thereof, and in the top center position of said piston projecting beyond the end of said cylinder and facing the laterally extending portion of the combustion chamber.

19. An internal combustion engine comprising a cylinder having a combustion chamber at one end thereof extending laterally therefrom; the ceiling of said combustion chamber extending downwardly from the laterally extending portion thereof to the side of the cylinder remote from said portion, and a piston in said cylinder having a head of step formation increasing in height towards the center thereof, and in the top center position of said piston projecting beyond the end of said cylinder and facing the laterally extending portion of the combustion chamber, and ignition means in the laterally extending portion of the combustion chamber.

20. An internal combustion engine comprising a cylinder having a combustion chamber at one end thereof extending laterally therefrom; the ceiling of said combustion chamber extending downwardly from the laterally extending portion thereof to the side of the cylinder remote from said portion, and a piston in said cylinder having a head of helicoidal step formation increasing in height towards the center thereof, and in the top center position of said piston projecting beyond the end of said cylinder and facing the laterally extending portion of the combustion chamber, and ignition means in the laterally extending portion of the combustion chamber.

21. An internal combustion engine comprising a cylinder having a combustion chamber at one end thereof extending laterally therefrom, valves in said laterally extending portion, ignition means therein, and a piston in said cylinder having a head of step formation increasing in height towards the center thereof, and, in the top center position of said piston, projecting beyond the end of said cylinder and facing the laterally extending portion of the combustion chamber.

22. An internal combustion engine comprising a cylinder having a combustion chamber at the end thereof extending laterally therefrom, a piston in said cylinder having a head of helicoidal step formation increasing in height toward the center thereof, and, in the top center position of said piston, projecting beyond the end of said cylinder and facing the laterally extending portion of the combustion chamber.

23. In an internal combustion engine, a cylinder head having a combustion chamber ceiling with surfaces in a variety of different planes in combination with a piston having a substantially helicoidal head projection extending up into the combustion chamber.

In testimony whereof, I have signed my name hereto.

ARLINGTON MOORE.